United States Patent [19]

Goossens et al.

[11] Patent Number: 4,776,913

[45] Date of Patent: Oct. 11, 1988

[54] METHOD OF IMPREGNATING AN ULTRAVIOLET RADIATION SCREENER INTO THE SURFACE OF POLYCARBONATE ARTICLE

[75] Inventors: John C. Goossens; Herbert L. Curry, both of Mt. Vernon, Ind.

[73] Assignee: General Electric Company, Pittsfield, Mass.

[21] Appl. No.: 945,458

[22] Filed: Dec. 23, 1986

[51] Int. Cl.$^4$ ............... B29C 47/06; B32B 27/28
[52] U.S. Cl. ............... 156/230; 156/244.27; 156/344; 264/129; 264/171; 264/210.2; 264/211.12; 264/232; 428/412
[58] Field of Search ............ 264/1.7, 2.6, 129, 210.2, 264/210.3, 210.4, 211.12, 232, 330, 171, 300; 156/230, 344, 244.27; 427/160; 428/412; 523/137

[56] References Cited

U.S. PATENT DOCUMENTS

| | | | |
|---|---|---|---|
| 3,594,264 | 7/1971 | Urban | 428/412 X |
| 4,146,658 | 3/1979 | Humphrey | 427/160 |
| 4,213,926 | 7/1980 | Toyoda et al. | 264/129 X |
| 4,322,455 | 3/1982 | Olson et al. | 427/160 |
| 4,323,597 | 4/1982 | Olson | 427/160 |
| 4,477,303 | 10/1984 | Ohe et al. | 156/230 |
| 4,519,154 | 5/1985 | Molari, Jr. | 264/211.12 X |
| 4,661,394 | 4/1987 | Curry et al. | 428/412 X |
| 4,668,588 | 5/1987 | Kishima | 428/412 |
| 4,683,172 | 7/1987 | LeGrand et al. | 428/412 |

FOREIGN PATENT DOCUMENTS

177034  4/1986  European Pat. Off. ............ 264/1.7

Primary Examiner—Jeffery Thurlow
Assistant Examiner—Leo B. Tentoni
Attorney, Agent, or Firm—William F. Mufatti; Spencer D. Conard

[57] ABSTRACT

A method for impregnating at least one surface of an aromatic carbonate resin article with an ultraviolet radiation screener comprising applying a protective masking element to at least one surface of said article, said protective masking element having disposed on the surface thereof which is in contact with said surface of said aromatic carbonate resin article an adhesive layer containing an effective amount of at least one ultraviolet radiation absorber, while said surface of said article is at a temperature sufficiently high for said ultraviolet radiation screener to migrate from said adhesive layer into the surface of said article in ultraviolet radiation screening effective amounts.

16 Claims, No Drawings

METHOD OF IMPREGNATING AN ULTRAVIOLET RADIATION SCREENER INTO THE SURFACE OF POLYCARBONATE ARTICLE

BACKGROUND OF THE INVENTION

The vast majority of organic polymeric materials undergo some mode of degradation when exposed to the high energy photons of ultraviolet radiation. This degradation manifests itself, depending upon the polymeric material, in yellowing, embrittlement, and other loss of physical and mechanical properties. Polycarbonate resins are no exception to this degradation by ultraviolet radiation.

While polycarbonate resins exhibit many excellent mechanical properties which render them suitable for use as thermoplastic emgineering materials, glazing materials, and films, their propensity towards degradation by ultraviolet radiation restricts their use in applications where they are exposed to sunlight. This is particularly true in the case where the polycarbonate resins are used as glazing materials or films which are exposed, by necessity, to sunlight.

The use of ultraviolet radiation screeners with various polymeric materials, including polycarbonates, to provide protection against degradation by ultraviolet radiation is known in the art. The ultraviolet radiation absorber or screener functions by reason of its ability to screen out or absorb the damaging ultraviolet portion of light due to its very high absorptivity in this range of the spectrum relative to that of the polymer. In order to qualify as a successful ultraviolet radiation screener for a polymer, particularly for polycarbonate resins, the screener must fulfill several requirements. The screener must have a high specific absorptivity in the range of wavelengths that are most deleterious to the polymer, it must be compatible with the polymer such as polycarbonate and must not degrade or adversely affect the polymer, the screener must not significantly absorb in the visible light region of the spectrum or a color will be imparted to the resin, and the screener must have a sufficiently low volatility so as to permit its continued presence in the polymer during processing of the polymer.

Several methods are known in the art and conventionally utilized for employing these ultraviolet radiation screeners to protect various organic resins against degradation by ultraviolet radiation. These methods include the blending of an ultraviolet radiation screener with the polymer prior to processing of the polymer, incorporating the screeners in surface coatings which are applied onto the surface of the polymer, and impregnating the surface of the polymer with the ultraviolet radiation screeners.

While each of these conventional prior art methods can be utilized to impart improved improved ultraviolet radiation stability to a polymer they all have certain disadvantages. Blending the absorber with the bulk polymer results in the absorber being distributed throughout the entire polymer. This procedure is both uneconomical, as these screeners are generally quite expensive, and not completely successful. Since most of the screener resides in the polymer's interior instead of at the surface of the polymer where it is most needed, much of the harmful ultraviolet radiation penetrates and deteriorates the surface areas of the polymer before reaching and being absorbed by the majority of the interiorly distributed screener. Furthermore, since the concentration of the screener in the resin is limited by the degree of compatibility of the screener with the polymer, using sufficiently high concentrations of screener effective to provide surface protection generally tends to adversely affect some of the advantageous mechanical properties of the polymer.

Incorporating the screeners in surface coatings suffers from the disadvantage of being difficult and expensive to use since an extra and complicated processing step is required. Furthermore, difficulties are sometimes encountered in adhering the coating to the surface of the polymer or in maintaining continued adequate adhesion, especially after prolonged exposure to weathering. Even when the coating material adheres well to the polymer and does not delaminate after weathering it often cannot be applied without forming unsightly streaks on the polymer surface.

While, in theory, the surface impregnation techniques are the most desirable since the ultraviolet radiation screeners are contained only in the surface regions of the polymer where they are most needed, in practice the conventional surface impregnation techniques also suffer from several disadvantages. Melting the polymer and the screeners in order to diffuse the screeners into the polymer surface suffers from the disadvantage that the polymer, or at least its surface layers, must be heated to the melting point. This may result in an uneven or wrinkled surface being formed upon cooling and solidifying of the surface. Furthermore, some of the advantageous mechanical properties of the polymer may be adversely affected by this melting of the processed polymer surface. In the aggressive solvent technique an ultraviolet radiation screener is dissolved in a solvent which is aggressive towards the polymer such as polycarbonate. Typical aggressive solvents for polycarbonates include chlorinated hydrocarbons, esters, or aromatic hydrocarbons. When these solutions are applied onto the surface of a polycarbonate article the aggressive solvent functions as a softening or swelling agent for the polymer surface allowing the screener to diffuse into the softened or swelled surface regions. However, the aggressive nature of these solvents causes problems. Surface imperfections can occur during impregnation and prolonged contact between the polymer and the aggressive solvent can lead to etching, hazing, and environmental stress cracking and crazing of the polymer. While the processes for surface impregnation of ultraviolet radiation screeners into polycarbonate articles described in U.S. Pat. Nos. 4,323,597 and 4,322,455, to Olson et al., which processes include contacting a solution containing an ultraviolet radiation screener and a non-aggressive solvent with a polycarbonate article which has been heated, overcome the disadvantages described hereinafore, they nevertheless require an additional step in the preparation and processing of the polycarbonate article and are time consuming and add to the expense of the finished product.

It is, therefore, an object of the instant invention to provide a method for the surface impregnation of ultraviolet radiation screeners into the surface layers of polycarbonate articles which overcomes the aforedescribed disadvantages, does not require an added processing step, and is economically and easily accomplished.

SUMMARY OF THE INVENTION

The instant invention is directed to a method for surface impregnating an aromatic carbonate resin substrate with ultraviolet radiation screeners. The method of the instant invention does not require any additional steps but is accomplished during the normal and conventional processing stages of aromatic carbonate resin articles such as sheets or films. This method comprises the application of a conventionally utilized protective masking element, which element has an ultraviolet radiation screener incorporated into the adhesive layer thereof, onto said aromatic carbonate resin sheet or film after the extrusion operation while the aromatic carbonate resin articles are still relatively hot. The ultraviolet radiation screener migrates from the adhesive layer of the protective masking element into the hot surface of the article thereby increasing the resistance to ultraviolet radiation degradation of said aromatic carbonate resin article's surface.

DESCRIPTION OF THE INVENTION

Aromatic carbonate resin articles such as sheets and films normally have a protective masking element such as paper or polyethylene film adhered to their surfaces to protect their surfaces from scratching, abrasion, and to facilitate handling. This protective masking element generally has a pressure sensitive adhesive layer dssposed on the surface thereof which is in contact with the aromatic carbonate resin article. The masking element is removably adhered to said article by means of said adhesive layer. This protective masking element is generally applied onto one or both surfaces of the aromatic carbonate resin sheets or films after said sheets or films are formed, for example, by an extrusion process by any of the conventional and well known means. These include passing the aromatic carbonate resin sheets or films between rollers having the protective masking element thereon and pressing the pressure sensitive adhesive layer of said element onto the surface of said sheet or film thereby removably adhering said masking element to said sheet or film surface or surfaces.

The method of the instant invention utilizes this integral step of applying the protective masking element onto an aromatic carbonate resin article surface to impregnate said surface with an ultraviolet radiation screener thereby protecting said surface from degradation by ultraviolet radiation. In the practice of the instant method an ultraviolet radiation screener is incorporated into the adhesive layer which is applied onto the protective masking element. The masking element having this ultraviolet radiation screener containing adhesive layer is then applied onto the aromatic carbonate resin article surface after said article comes out of the extruder and while it is still generally hot. The ultraviolet radiation screener migrates from said adhesive layer into the surface areas of said article and impregnates said surface layers.

The instant method thus comprises impregnating the surface layers of an aromatic carbonate resin article by applying a protective making element having an ultraviolet radiation screener containing adhesive layer on one side thereof onto at least one surface of said article while said article is at a temperature sufficiently high for said ultraviolet radiation screener to migrate from said adhesive layer into the surface layers of said article.

When said aromatic carbonate resin article is ready for use the protective masking element is removed from the surface or surfaces of said aromatic carbonate resin article and utilized, for example, as a film or sheet for glazing structures.

The aromatic carbonate resins which comprise the article or substrate are conventional well known thermoplastic, high molecular weight, aromatic carbonate polymers which are described, along with the methods of their preparation, inter alia, in U.S. Pat. Nos. 3,161,615, 3,220,973, 3,312,660, 3,312,659, 3,313,777 3,666,614 and 3,393,672, all of which are incorporated herein by reference.

The polycarbonates generally contain at least one recurring structural unit represented by the formula

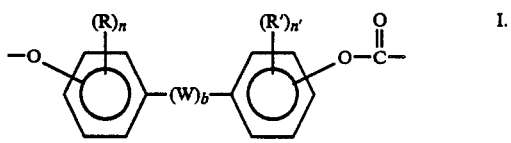

wherein:
R and R' are independently selected from monovalent hydrocarbon radicals, monovalent hydrocarbonoxy radicals, and halogen radicals;
W is selected from divalent hydrocarbon radicals,

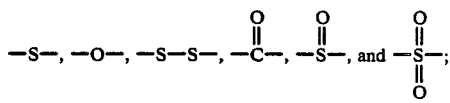

n and n' are independently selected from integers having a value of from 0 to 4 inclusive; and
b is either zero or one.

The monovalent hydrocarbon radicals represented by R and R' include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The monovalent hydrocarbonoxy radicals represented by R and R' may be represented by the formula $-OR^1$ wherein $R_1$ is a monovalent hydrocarbon radical of the type described hereinafore. Preferred hydrocarbonoxy radicals are the alkoxy and aryloxy radicals.

The preferred halogen radicals represented by R and R' are chlorine and bromine.

The divalent hydrocarbon radicals represented by W include the alkylene, alkylidene, cycloalkylene, and cycloalkylidene radicals. Preferred alkylene radicals are those containing from 2 to about 10 carbon atoms. Prferred alkylidene radicals are those containing from 1 to about 20 carbon atoms. Preferred cycloalkylene and cycloalkylidene radicals are those containing from 6 to about 16 ring carbon atoms.

The polycarbonates may be conveniently prepared by the reaction of a dihydric phenol with a carbonate precursor utilizing the interfacial polymerization process. Typically, the dihydric phenols used may be represented by the formula

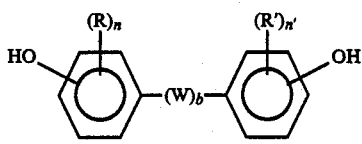

wherein R, R', W, n. n' and b are as defined hereinafore.

Some illustrative non-limiting examples of these dihydric phenols include:
2,2-bis(4-hydroxyphenyl)propane (bisphenol-A);
2,2-bis(3,5-dimethyl-4-hydroxyphenyl)propane;
bis(4-hydroxyphenyl)methane;
2,2-bis(3,5-dibromo-4-hydroxyphenyl)propane;
1,1-bis(4-hydroxyphenyl)decane;
1,1-bis(4-hydroxyphenyl)cyclohexane;
1,1-bis(3,5-dimethyl-4-hydroxyphenyl)cyclododecane;
4,4'-thiodiphenol; and
bis(4-hydroxyphenyl)ether.

Other dihydric phenols are also available and are disclosed, inter alia, in U.S. Pat. Nos. 2,999, 835, 3,028,365 and 3,334,154, all of which are incorporated herein by reference.

It is, of course, possible to employ a mixture of two or more different dihydric phenols as well as individual dihydric phenols in the preparation of these polycarbonates.

The carbonate precursor employed may be a carbonyl halide, a carbonate ester, or a bishaloformate. The preferred carbonate precursor is carbonyl chloride.

These polycarbonates may be prepared by well known conventional processes such as the interfacial polymerization process, transesterification, and melt polymerization. Some of these processes are disclosed in U.S. Pat. Nos. 4,018,750, 4,123,436 and 3,153,008, all of which are incorporated herein by reference.

Also included within the scope of the term polycarbonate resin or aromatic carbonate resins are the copolyester-carbonate resins. These copolyester-carbonate resins, as well as methods for their preparation, known in the art and are describe, inter alia, in U.S. Pat. No. 3,169,121, which is incorporated herein by reference.

The ultraviolet radiation screeners which are incorporated into the adhesive layer of the protective masking element are well known generally commercially available materials. These ultraviolet radiation screeners are those compounds which function by reason of their ability to screen out or absorb the ultraviolet portion of light due to their very high absorptivity in this range of the spectrum. Some illustrative non-limiting examples of these ultraviolet radiation screeners include benzophenone, the benzophenone derivatives, benzotriazole, the benzotriazole derivatives, benzoate esters, phenyl salicylates, derivatives of crotonic acid, malonic acid esters, and cyanoacrylates.

Included among the ultraviolet radiation screeners which fall into the categories of the benzophenone and benzotriazole derivatives are those compounds described in U.S. Pat. Nos. 3,309,220, 3,049,443, 3,043,709 and 2,976,259, all of which are incorporated herein by reference. Some illustrative non-limiting examples of these compounds include 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4-methoxy-4'-ethoxybenzophenone, 2-hydroxy-4,4'-5'-trimethoxybenzophenone, 2-hydroxy-4-propoxy-4',6'-dibromobenzophenone, 2-hydroxy-4-ethoxy-4'-bromobenzophenone, 2-(2'-hydroxy-5'-methylphenyl)-benzotriazole, 2-(2'-hydroxy-5'-tert-butylphenyl)benzotriazole, 2-(2'-hydroxy-3'-methyl-5'-tert-butylphenyl)-benzotriazole, 2-(2'-hydroxy-3',5'-dimethylphenyl)benzotriazole, and 2-(2'-hydroxy3'-di-tert-butylphenyl)benzotriazole.

Some illustrative non-limiting examples of the derivatives of crotonic acid which function as ultraviolet radiation screeners include alpha-beta-methyl-beta-(p-methoxyphenyl)crotonic acid methyl ester and alpha-cyano-beta-N-(2-methyl-indolinyl) crotonic acid methyl ester.

The benzoate ester ultraviolet radiation screeners include the $C_8$–$C_{20}$ alkyl and aryl benzoates, alkyl and aryl hydroxy benzoates, alkaryl and aralkyl benzoates, and alkaryl and aralkyl hydroxybenzoates.

The malonic acid esters which are ultraviolet radiation absorbing compounds include the dimethyl, diethyl, dipropyl, and the like esters of malonic acid, i.e., the dialkyl esters of malonic acid. Particularly useful esters of malonic acid are the benzylidene malonates. The benzylidene malonates are compounds represented by the general formula

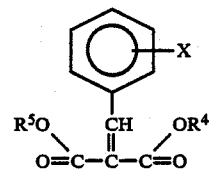

III.

wherein X is independently selected from hydrogen, hydroxyl, halogen, alkyl, preferably $C_1$–$C_{10}$ alkyl, alkoxy, preferably $C_1$–$C_{10}$ alkoxy, radicals, or mixtures of these aforementioned radicals; and $R^4$ and $R^5$ are independently selected from alkyl radicals, preferably $C_1$–$C_{10}$ alkyl radicals, substituted alkyl radicals, preferably those containing from 1 to about 10 carbon atoms and hydroxyl or halogen substituents, aryl radicals, preferably the phenyl radical; alkaryl radicals, preferably those containing from 7 to about 14 carbon atoms; aralkyl radicals, preferably those containing from 7 to about 14 carbon atoms, and substituted aryl radicals, preferably phenyl radicals containing hydroxyl or halogen substituents. Preferred benzylidene malonates represented by Formula III are those wherein X represents an alkoxy group and $R^4$ and $R^5$ are independently selected from alkyl radicals. Some illustrative non-limiting examples of these benzylidene malonates include diethyl paramethoxy benzylidene malonate and dimethyl paramethoxy benzylidene malonate.

Among the cyanoacrylates which are useful ultraviolet radiation screeners are those cyanoacrylates represented by the formula

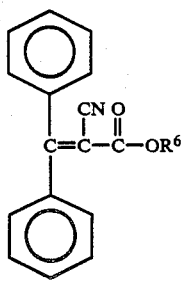

IV.

wherein $R^6$ is alkyl or hydroxyalkyl. These types of compounds are disclosed in U.S. Pat. No. 4,129,667 which is hereby incorporated herein by reference.

Quite useful ultraviolet radiation screening compounds, from the standpoint of the instant invention, are benzophenone derivatives, benzotriazole derivatives, benzylidene malonates, and the cyanoacrylates.

In the practice of the method of the instant invention the ultraviolet radiation screeners are incorporated into the pressure sensitive adhesive layer of the protective masking element which is applied onto the surfaces of the aromatic carbonate article. This incorporation is normally accomplished by mixing or thoroughly blending at least one ultraviolet radiation screener with the pressure sensitive adhesive and then applying this mixture, by conventional means, onto one side of said paper or polyethylene backing to form said pressure sensitive adhesive layer The mixing or blending of the ultraviolet radiation screener with the adhesive material is normally accomplished by first dissolving the adhesive material in a solvent, such as an organic solvent or water, and then mixing the ultraviolet radiation screener into this solution. The solution containing the ultraviolet radiation screener is then coated onto the backing and the solvent is evaporated thus forming a thin film of an ultraviolet radiation screener containing adhesive The amount of the ultraviolet radiation screener present in said adhesive layer is an amount which, when said adhesive layer is contacted with the hot aromatic carbonate substrate, is effective to improve the resistance of said aromatic carbonate surface against degradation by ultraviolet radiation. In general this amount is from about 3 to about 40 weight percent, preferably from about 4 to about 35 weight percent, and more preferably from about 5 to about 30 weight percent. Weight percent of ultraviolet radiation screener present in said adhesive layer is based on the total amounts of adhesive material and ultraviolet radiation screener present in said layer.

Generally, if less than about 3 weight percent of said ultraviolet radiation screener is present in the adhesive layer the amount of screener which migrates from said adhesive layer and into the surface layers of the aromatic carbonate resin articles, i.e., impregnates the surface of the aromatic carbonate resin article, is insufficient to provide a significant improvement in resistance to the deleterious effects of ultraviolet radiation. If, on the other hand, more than about 40 weight percent of said ultraviolet radiation screener is present in the adhesive layer the adhesive properties of said adhesive layer begin to be substantially deleteriously affected.

The adhesive materials utilized for the pressure sensitive adhesive layer are well known conventional materials which are generally readily commercially available. These pressure or contact sensitive adhesive materials include, but are not limited to, thermoplastic or crosslinked polymers such as styrene-diene based polymers such as styrenebutadiene copolymers or styrene-isoprene-styrene copolymers; ethylene based polymers such as ethylene vinyl acetate copolymers and ethylene vinyl acetate acid terpolymers; olefin vinyl esters such as those described in commonly assigned copending patent application Ser. No. 688,376, filed 01/02/85, which is hereby incorporated herein by reference; olefin vinyl alcohols such as those described in U.S. Pat. No. 3,585,177, which is hereby incorporated herein by reference; and acrlyic based polymers such as 2-ethyl hexyl acrylate copolymerized with a small amount of acrylamide.

The pressure sensitive adhesive may be formed by any common method known in the adhesive industry, such as methods involving a solvent, preferably water, a hot melt, an aqueous emulsion, and the like. Although great progress is presently being made to improve the tack, cohesion, and adhesion of pressure sensitive adhesives produced by any of the above methods, the solvent-borne adhesives, particularly the water-borne adhesives, are preferred because of their physical properties.

The preferred pressure sensitive adhesives are the acrylic based polymers made by the free radical polymerization of primarily acrylate ester monomers. These acrylate ester monomers may be represented by the formula

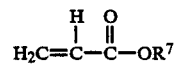

V.

wherein $R^7$ is a monovalent hydrocarbon radical, preferably an alkyl radical containing from 1 to about 12 carbon atoms. Often, these polymers contain minor portions of other non-acrylic comonomers which enhance certain physical or performance properties of the polymer or provide reactive sites for crosslinking. Thus, the term "acrylic" as used herein refers to the spectrum of pressure sensitive polymers containing acrylate as well as lesser portions of non-acrylate monomers. Typically, the acrylate pressure sensitive adhesives are a copolymer of a higher alkyl acrylate copolymerized with a lesser portion of a polar comonomer. Suitable polar comonomers are acrylic acid, acrylamide, maleic anhydride, diacetone acrylamide, and long chain alkyl acrylamides.

The pressure sensitive adhesive layer may also optionally contain the various well known and conventionally used additives such as tackifiers, plasticizers, fillers, and antioxidants.

Illustrative of a suitable contact or pressure sensitive adhesive is the V-22 adhesive manufactured by FLEX-CON Company of Spencer, MA. This adhesive material is an ultra clear thermoset acrylic copolymer having good water and humidity stability.

The protective masking element having the pressure sensitive adhesive layer containing at least one ultraviolet radiation absorber is applied onto the aromatic carbonate article after it is extruded but while it is still relatively hot, i.e., before the extruded article has had a chance to cool down to ambient or room temperatures. It is critical to the practice of the method of the instant invention that the aromatic carbonate article be at a temperature sufficiently high when the ultraviolet radiation screener containing pressure sensitive adhesive is contacted with or applied onto the surface thereof for the ultraviolet radiation screener to migrate from the adhesive layer into the surface layers of said article and to impregnate these surface layers. If said article is not at a temperature effective for the ultraviolet radiation screener to impregnate the surface layers thereof, i.e., it has cooled down too much after exiting from the extruder, the ultraviolet radiation screener will not migrate from said adhesive layer and diffuse into the surface layers of said article in amounts effective to impart a significant degree of protection against degradation by ultraviolet radiation to said surface. Generally, the minimum temperature at which impregnation of the surface of the polycarbonate article takes place is about 30° C. Preferably the polycarbonate article should be at a temperature of at least about 35° C. The polycarbonate article should generally be at a temperature which is below its softening point, as application of the protective masking element to a surface softened polycarbonate article will result in an adverse effect upon the surface of said article once it has cooled, e.g. there will be deformation of the surface. Thus the upper temperature limit at which the protective masking elemnet is applied is below about 140° C., preferably below about 130° C. A particularly useful temperature range, i.e., one where the ultraviolet radiation screener migrates into the surface layers of the polycarbonate substrate quite effectively and wherein there are generally no adverse effects upon the surface properties of the article when the protective masking element is applied thereon, is generally from about 35° to about 100° C.

Once the protective masking element has been applied onto the surface of the aromatic carbonate article it is left in place until the article is ready for use, whereupon the masking element is easily removed therefrom by peeling it off from said surface.

DESCRIPTION OF THE PREFERRED EMBODIMENT

In order to more fully and clearly illustrate the present invention the following examples are set forth by way of illustration and not by way of limitation. In the examples all parts and percentages are on a weight basis unless otherwise specified.

The following example illustrates a polycarbonate resin sheet falling outside the scope of the instant invention. It is presented for comparative purposes only.

EXAMPLE 1

A polycarbonate resin (derived from bisphenol-A and phosgene) sheet measuring 0.004" thick, having no ultraviolet radiation screener in its surface layers, is measured for UV light absorbance at 360 manometers with a UV visible spectrophotometer. The % of ultraviolet light absorbed by this unmodified polycarbonate sheet is 0% as compared to a standard polycarbonate sheet of the same thickness.

The following examples illustrate the treated polycarbonate resin articles of the present invention.

EXAMPLE 2

An ultraviolet radiation screener containing adhesive coating composition is prepared by adding from about 6–10 weight % of 2-hydroxy-n-octoxybenzophenone to a solution of an acrylic rubber adhesive. This coating composition is then applied onto one surface of a thin polyethylene masking sheet, and the solvents are evaporated to form a solid pressure sensitive adhesive layer containing the UV absorber. This polyethylene masking sheet is then applied onto one side of a thin aromatic polycarbonate resin sheet having a thickness of 0.004" with the side of said polyethylene masking sheet containing said pressure sensitive adhesive being in surface-to-surface contact with the polycarbonate sheet. The polycarbonate sheet having the masking sheet adhered to one side thereof is placed in an oven and heated at 100° F. for about 25 minutes. At the end of this period the polycarbonate sheet is removed from the oven, cooled, and the masking polyethylene sheet or film is removed therefrom. The % UV light absorbance of this polycarbonate sheet is measured in accordance with the procedure of Example 1 and is found to be 95% as compared to a standard polycarbonate sheet of the same thickness.

EXAMPLE 3

The procedure of Example 2 is substantially repeated except that the 2-hydroxy-4-n-octoxybenzophenone is replaced with 2-ethylhexyl-2-cyano-3,3diphenyl acrylate. The % of UV light absorbance is measured and is determined to be 47% as compared to a standard polycarbonate sheet of the same thickness.

As illustrated by the examples the polycarbonate sheets of the instant invention (Examples 2-3) absorb more ultraviolet radiation as compared to the unmodified polycarbonate sheet of Example 1, thus indicating that the UV absorber contained in the adhesive layer of the masking element has migrated into the polycarbonate sheet.

Obviously, other modifications will suggest themselves to those skilled in the art in light of the above detailed description. All such modifications are within the full intended scope of the present invention as defined by the appended claims.

What is claimed is:

1. A method for impregnating at least one surface layer of an aromatic carbonate resin article with an ultraviolet radiation screener comprising applying a protective masking element to at least one surface of said article, said protective masking element having disposed on the surface thereof which is in contact with said surface of said aromatic carbonate resin article an adhesive layer containing an effective amount of at least one ultraviolet radiation screener, while said surface of said article is at a temperature effective for said ultraviolet radiation screener to migrate from said adhesive layer into the surface of said article in an effective quantity to provide protection thereto from ultraviolet radiation, said protective masking element being removably adhered to said article.

2. The method of claim 1 wherein said effective quantity is an ultraviolet radiation absorbing effective amount.

3. The method of claim 1 wherein said aromatic carbonate resin article is an extruded article.

4. The method of claim 3 wherein said extruded article is in the form of a sheet.

5. The method of claim 1 wherein said temperature is at least about 30° C.

6. The method of claim 1 wherein said aromatic carbonate resin is an aromatic polycarbonate resin.

7. The method of claim 1 wherein said aromatic carbonate resin is an aromatic copolyester-carbonate resin.

8. The method of claim 3 wherein said extruded article is in the form of a film.

9. The method of claim 1 wherein said adhesive layer is comprised of a pressure sensitive adhesive.

10. The method of claim 9 wherein said adhesive layer is comprised of an acrylic polymer.

11. The method of claim 10 wherein said acrylic polymer is a rubber modified acrylic polymer.

12. The method of claim 1 wherein said adhesive layer contains from about 3 to about 40 weight percent of at least one ultraviolet radiation screener.

13. The method of claim 1 wherein said ultraviolet radiation screener is selected from benzophenone derivatives, benzotriazole derivatives, benzylidene malonates, cyanoacrylate, or mixtures thereof.

14. The method of claim 1 wherein said temperature is at least about 35° C.

15. The method of claim 14 wherein said temperature is at most about 140° C.

16. The method of claim 1 wherein said article is extruded at temperature above 35° C., said protective masking element being applied to said article before said article has cooled down to a temperature below 35° C.

* * * * *